May 21, 1968 S. DUINKER ET AL 3,384,880

DISC MEMORY STORAGE COMPRISING MAGNETIC HEADS ARRANGED OBLIQUELY TO THE TRACK

Filed Sept. 30, 1964 2 Sheets-Sheet 1

INVENTORS
SIMON DUINKER &
GERHARD HAAS
BY Frank R. Trifari
AGENT

INVENTORS
SIMON DUINKER
GERHARD HAAS
BY
Frank R. Trifari
AGENT

United States Patent Office 3,384,880

Patented May 21, 1968

3,384,880
DISC MEMORY STORAGE COMPRISING MAGNETIC HEADS ARRANGED OBLIQUELY TO THE TRACK

Simon Duinker, Hamburg, Bahrenfeld, and Gerhard Haas, Hamburg, Germany, assignors to North American Philips Company Inc., New York, N.Y., a corporation of Delaware Filed Sept. 30, 1964, Ser. No. 400,443
Claims priority, application Germany, Oct. 16, 1963, P 32,785
6 Claims. (Cl. 340—174.1)

ABSTRACT OF THE DISCLOSURE

A magnetic disc storage device for providing a substantially constant bit capacity and sequence frequency over a plurality of concentric storage tracks is provided with a displaceable magnetic head having a gap positioned with respect to the tangent of the innermost magnetic track at an angle of somewhere between 0 and 90 degrees. The angle will vary in accordance with the radius of the innermost track and the next sequential track from the common center of the tracks. The angular shift of the head for two successive tracks will decrease with an increase in radius to the second of the two successive tracks.

The invention relates to a disc memory storage for the magnetic recording and reproduction of information by means of magnetic heads displaceable relatively to the disc.

The maximum bit density of a disc memory storage is given by the resolving power of the magnetic record on the inner track. If all tracks have to exhibit the same bit frequency, the bit density (number of bits/cm.) decreases with an increasing radius of the track. The disc is therefore utilized fully in this way only on the inner track as far as its storing capacity is concerned. Instead of the available surface segment (circular ring section) only a considerably smaller surface is used for storing, when one has started from an angle, which is required on the inner track for one bit. The utilization of the surface of such a disc storage amounts to about 67% for a ratio between the inner radius and the outer radius of the segments of 1:2.

For an improved utilization of the discs there are known apparatus in which the storage surface is divided into a plurality of zones and the number of bits increases with an increasing radius from zone to zone and is determined by the permissible storing density of the smallest track of each zone. For example for 6 zones and with the same ratio between the radii as stated above, the surface can be utilized up to 94%. This comparatively good percentage of utilization is obtained however, at the expense of the fact that each zone then has its own bit sequence frequency. Consequently, with 6 zones the storage must operate with six different frequencies. For the use of the storage it is, moreover, a disadvantage that the tracks of the separate zones have different storing capacities.

The invention provides a solution of the problem so that the available storage surface of each zone can be fully utilized, while under the action of the same bit sequence frequency each track has the same capacity.

The invention consists in that the gap of the magnetic head is positioned with respect to the tangent of the magnetic track at an acute, or at the most a right angle. The angle will vary with the radius of the relevant magnetic track, while the shift of the heads for two successive tracks decreases with an increasing radius.

The invention provides 100% utilisation of the track range of a disc storage, while in the whole track range only one bit sequence frequency is employed.

The drawing shows some embodiments.

The novel disc storage is based on the fact that the gap of the magnetic head is, in accordance with the radius $\rho$ of the track, at an angle $\varphi$ to the tangent of the track, which angle is given by the relation:

$$\varphi = \text{arc sin}\,\frac{r}{\rho}$$

wherein $r$ designates the radius of the inner track. The adjustment of said angle may for example with the conventional radial formation of the tracks be carried out by a supplementary turning of the head through an angle $\varphi(\rho)$, or without turning, by forming the tracks in a direction perpendicular to the direction of the gaps of the heads. The heads are not moved then in a radial direction but along a chord or a secant, tangential to the inner track.

Figure 1:
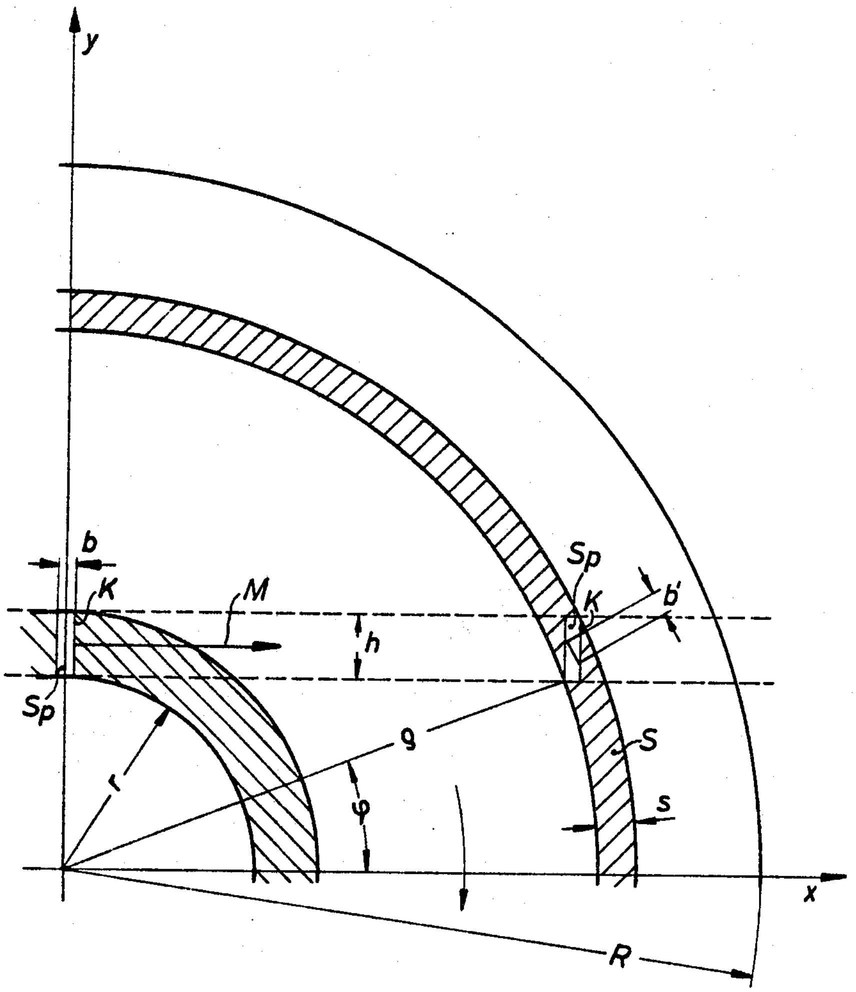
FIG. 1 is a diagrammatic representation of a disc storage according to the invention.

FIG. 1 illustrates this principle. The shifting of the head K is in the direction $x$ by a means illustrated generally as M. The gap $Sp$ of the head K then no longer crosses the magnetic tracks S at right angles but at an angle $\varphi$. On the condition that the length of the magnetic dipoles in the storage layer is sufficiently small with respect to the effective height $h$ of the head, the head covers, in the direction of the radius, only the range:

$$s = h \sin \varphi = \frac{hr}{\rho}$$

so that the width of the track decreases with an increasing radius. The number of tracks per millimeter:

$$z = 1/s = \rho/hr$$

is therefore a function of the radius $\rho$ of the track. In the track range $R-r$ the number of tracks found is:

$$Z = \int_r^R z\,d\rho = \frac{R^2 - r^2}{2hr}$$

With the known disc storages however, the number of tracks is given by:

$$Z' = \frac{R-r}{h}$$

With the same number of bits on all tracks the increase in the number of tracks provides an increase in storing capacity by the factor:

$$\frac{Z}{Z'} = \frac{R+r}{2r}$$

The loss of storing capacity which is normally involved in a zone owing to the constancy of the bit sequence frequency for all tracks, is therefore, according to the invention, completely compensated for by the increase of the number of tracks. Moreover, all tracks now have the same capacities.

On the condition that with pulse recording the variation of the writing current with time is so rapid that in this respect the rotation of the disc may be neglected, the same length is obtained for all magnetic dipoles.

The invention therefore provides, in addition, the advantage that the sensitivity of the magnetic heads in reading is the same for all tracks. For the reading voltage there is found $$u=\frac{d\phi}{dt}=\frac{v \sin \varphi}{\lambda}=w\frac{r}{\lambda}$$

where λ is the displacement of the gap, relative to the record carrier (measured perpendicular to the gap) corresponding to a change in the magnetic flux $\phi$ of one unit ($d\phi=1$). The increasing oblique position of the heads is compensated for by the increase in circumferential speed of the external tracks.

The storage proposed is also suitable for recording harmonic signals. If the gap width $b$ of the heads is small with respect to the recorded wavelength, the output voltage of the reproduced signals decreases on a first approximation proportionally to the width of the track. An additional decrease in the output voltage with an increasing radius of the track appears as soon as the recorded wavelength is no longer great with respect to the gap width, the thickness of the layer and the distance between the head and the layer, since in this case the widening of the effective gap:

$$b'=\frac{b}{\sin \varphi}$$

plays a part.

Figure 2:
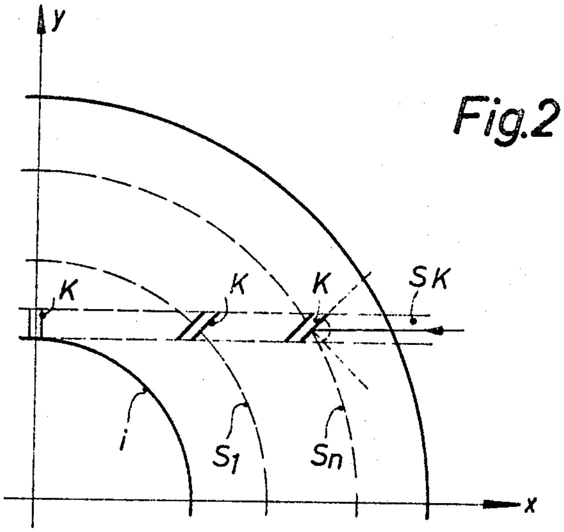
FIG. 2 shows diagrammatically an arrangement comprising a plurality of magnetic heads moved along a secant and FIG. 3 shows an embodiment having a plurality of magnetic heads moved along a plurality of secants.
Figure 3:
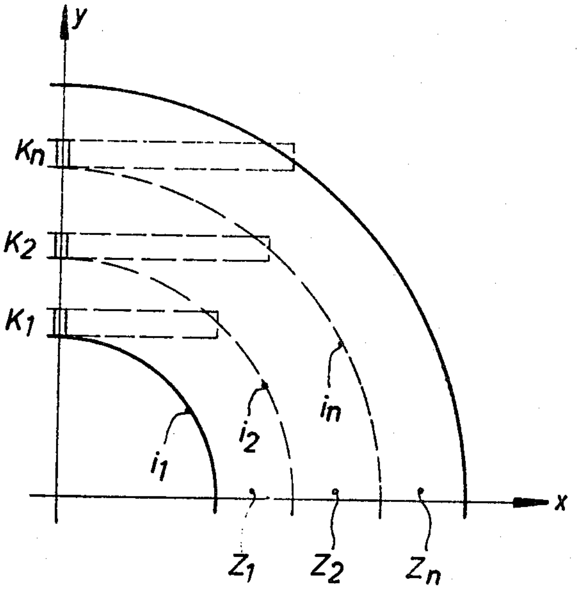

According to a further development of the invention there is a possibility of dividing the storage surface into a plurality of zones $S_1 \ldots S_n$ and by suitable orientation of the gap for the individual zones, to vary the freedom in width of the head (and hence the width of the track) and in bit sequence frequency (and hence the density of storing). The head(s) K may move in common along the same secant SK, whereas the inner track $i$ is tangential as is shown in FIG. 2. Alternatively, they may be arranged individually on the secants $SK_1 \ldots SK_n$ tangential to the inner track $i_1 \ldots i_n$ of the corresponding zones $Z_1 \ldots Z_n$, as is shown in FIG. 3. In principle the separate zones $Z_1 \ldots Z_n$ can be formed here by the individual heads $K_1 \ldots K_n$.

Moreover, the devices shown in FIGS. 1 to 3 have the advantage that the mechanical control of the heads can be performed from both sides, whereas in the storages hitherto known this control is only unilateral with respect to the central storage axis. This new possibility is useful for rapid and accurate adjustment of the heads to the track.

What is claimed is:

1. A disc memory storage device for the magnetic recording and reproducing of information, comprising a rotatable magnetic storage disc having a plurality of concentrically arranged substantially circular storage tracks having a common center, a plurality of magnetic heads each provided with an operative gap for transducing information to and from said tracks, means for displacing each of said heads in a direction tangential to at least one of said tracks, one of said heads being positioned with respect to said one of said tracks so that the operating gap thereof is at an angle with respect to the tangent of said track, said angle decreasing with displacement of said head along said tangent to the next successive track having a higher radius from said common center, each of said tracks thereby accommodating a substantially equal content of information at a substantially constant sequence frequency.

2. A disc storage as claimed in claim 1, wherein said displaceable magnetic head is rotatable.

3. A disc storage as claimed in claim 1, wherein each said magnetic head is displaceable along a secant of a respective one of said disc storage tracks.

4. A disc storage as claimed in claim 3, wherein a plurality of magnetic heads are adapted to be displaced along a secant of said disc storage tracks.

5. A disc storage as claimed in claim 4, wherein a plurality of magnetic heads are adapted to move along a plurality of secants, each said secant of a storage zone being associated with a plurality of magnetic tracks.

6. A disc memory storage device for the magnetic recording and reproducing of information, comprising a rotatable magnetic storage disc having a plurality of concentrically arranged substantially circular storage tracks having a common center, a plurality of magnetic heads each provided with an operative gap for transducing information to and from said tracks, means for displacing at least one of said heads along a line tangential to at least one of said tracks, one of said heads being positioned with respect to said one of said tracks so that the operating gap of said head is at an angle with respect to the said tangential line equal to the arc sin of the ratio of the radial distance from said common center to said one of said tracks with respect to the radial distance from said common center to the intersection of said tangential line with the next successive one of said tracks.

References Cited

UNITED STATES PATENTS

| | | | |
|---|---|---|---|
| 3,066,196 | 11/1962 | Stern | 179—100.2 |
| 3,187,316 | 6/1965 | Johnson et al. | 340—174.1 |

BERNARD KONICK, *Primary Examiner.*

L. G. KURLAND, A. I. NEUSTADT, *Assistant Examiners.*